United States Patent
Mandalia et al.

(10) Patent No.: US 10,011,303 B1
(45) Date of Patent: Jul. 3, 2018

(54) VEHICLE FRAME, BODY, AND CABIN STRUCTURE ASSEMBLY

(71) Applicant: GM GLOBAL TECHNOLOGY OPERATIONS LLC, Detroit, MI (US)

(72) Inventors: Bhavin Mandalia, Macomb, MI (US); Stewart T. Edmison, Oshawa (CA); David C. Cochrane, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/613,687

(22) Filed: Jun. 5, 2017

(51) Int. Cl.
*B62D 24/00* (2006.01)
*B62D 25/20* (2006.01)

(52) U.S. Cl.
CPC ......... *B62D 24/00* (2013.01); *B62D 25/2009* (2013.01)

(58) Field of Classification Search
CPC .. B62D 24/00; B62D 24/022; B62D 25/2009; B62D 33/06; B62D 33/0604; B60N 2/06; B60N 2/07; B60N 2/015
USPC ................... 296/65.13, 35.1, 190.01, 190.07
See application file for complete search history.

(56) References Cited

U.S. PATENT DOCUMENTS

| 5,352,011 | A | * | 10/1994 | Kihara | B62D 23/00 296/203.03 |
| 8,002,064 | B2 | * | 8/2011 | Yamada | B62D 21/09 180/311 |
| 9,139,237 | B1 | * | 9/2015 | Ganti | B62D 33/077 |
| 9,944,160 | B2 | * | 4/2018 | Nakamura | B60K 1/04 |
| 9,956,861 | B2 | * | 5/2018 | Nomura | B60K 1/04 |
| 2004/0245033 | A1 | * | 12/2004 | Saeki | B62D 39/00 180/89.1 |
| 2005/0134069 | A1 | * | 6/2005 | Odulio | B62D 24/02 296/35.1 |
| 2017/0158039 | A1 | * | 6/2017 | Nakamura | B60K 1/04 |
| 2017/0217296 | A1 | * | 8/2017 | Nomura | B60K 1/04 |

* cited by examiner

Primary Examiner — Gregory A Blankenship

(57) ABSTRACT

An automotive vehicle includes a body with a cabin. The cabin includes a cabin floor, and a rail member is disposed within the cabin. The vehicle also includes a frame having a frame structural member. The vehicle additionally includes a body structural member disposed below the cabin floor. The vehicle further includes a first bulkhead disposed between the body structural member and the cabin floor, and a second bulkhead disposed between the body structural member and the cabin floor. A gap is provided between at least a portion of the first bulkhead and the second bulkhead. A first fastener secures the body structural member to the frame structural member. The first fastener passes through a first location in the gap. A second fastener secures the body structural member to the rail member. The second fastener passes through a second location in the gap.

17 Claims, 5 Drawing Sheets

VEHICLE FRAME, BODY, AND CABIN STRUCTURE ASSEMBLY

TECHNICAL FIELD

The present disclosure relates to a mounting assembly for a vehicle, and more particularly for a mounting assembly for a body-on-frame automotive vehicle.

INTRODUCTION

Body-on-frame refers to an automotive industry manufacturing methodology wherein a separate body is mounted to a rigid frame which supports the body, drivetrain, and suspension. While other constructions may be used, such as a body-integrated-frame or space frame, body-on-frame may be desirable for heavier-duty vehicles, especially those which are intended to carry and pull loads, such as trucks and pickup trucks, and those which are off-road capable, such as sport-utility vehicles.

SUMMARY

An automotive vehicle according to the present disclosure includes a body with a cabin. The cabin includes a cabin floor, and a rail member is disposed within the cabin. The vehicle also includes a frame having a frame structural member. The vehicle additionally includes a body structural member disposed below the cabin floor. The vehicle further includes a first bulkhead disposed between the body structural member and the cabin floor, and a second bulkhead disposed between the body structural member and the cabin floor. A gap is provided between at least a portion of the first bulkhead and the second bulkhead. A first fastener secures the body structural member to the frame structural member. The first fastener passes through a first location in the gap. A second fastener secures the body structural member to the rail member. The second fastener passes through a second location in the gap.

In an exemplary embodiment, the first bulkhead has a first end and a second end. The first end is coupled to the second bulkhead and the second end is spaced from the second bulkhead. Such embodiments may additionally include a reinforcement plate coupling the second end to the second bulkhead. The second fastener may secure the seat rail member to the reinforcement plate.

In an exemplary embodiment, the assembly additionally includes a fastener sleeve disposed between the first and second bulkheads, the first fastener being retained by the fastener sleeve.

In an exemplary embodiment, the assembly additionally includes a cage nut disposed between the first and second bulkheads, the second fastener being retained by the cage nut.

In an exemplary embodiment, the first bulkhead has a first bulkhead first portion, a first bulkhead second portion, and a first bulkhead third portion, and the second bulkhead has a second bulkhead first portion, a second bulkhead second portion, and a second bulkhead third portion. The first bulkhead first portion is secured to the second bulkhead first portion, the first fastener is disposed between the first bulkhead second portion and the second bulkhead second portion, and the second fastener is disposed between the first bulkhead third portion and the second bulkhead third portion. In some such embodiment, the first bulkhead second portion is spaced a first distance from the second bulkhead second portion, the first bulkhead third portion is spaced a second distance from the second bulkhead third portion, and the second distance is greater than the first distance.

A vehicle assembly includes a frame structural member, a body structural member, and first and second bulkheads disposed proximate the body member. The vehicle assembly additionally includes a seat rail member, a first fastener, and a second fastener. The first fastener secures the frame structural member to the body structural member between the first and second bulkheads. The second fastener secures the seat rail member to the body structural member between the first and second bulkheads.

In an exemplary embodiment, the first bulkhead has a first end and a second end. The first end is coupled to the second bulkhead and the second end is spaced from the second bulkhead. Such embodiments may additionally include a reinforcement plate coupling the second end to the second bulkhead. The second fastener may secure the seat rail member to the reinforcement plate.

In an exemplary embodiment, the assembly additionally includes a fastener sleeve disposed between the first and second bulkheads, the first fastener being retained by the fastener sleeve.

In an exemplary embodiment, the assembly additionally includes a cage nut disposed between the first and second bulkheads, the second fastener being retained by the cage nut.

In an exemplary embodiment, the first bulkhead has a first bulkhead first portion, a first bulkhead second portion, and a first bulkhead third portion, and the second bulkhead has a second bulkhead first portion, a second bulkhead second portion, and a second bulkhead third portion. The first bulkhead first portion is secured to the second bulkhead first portion, the first fastener is disposed between the first bulkhead second portion and the second bulkhead second portion, and the second fastener is disposed between the first bulkhead third portion and the second bulkhead third portion. In some such embodiment, the first bulkhead second portion is spaced a first distance from the second bulkhead second portion, the first bulkhead third portion is spaced a second distance from the second bulkhead third portion, and the second distance is greater than the first distance.

A method of assembling a vehicle according to the present disclosure includes providing a vehicle body. The body includes a cabin with a cabin floor and a body structural member disposed below the cabin floor. The method also includes disposing a rail member within the cabin. The method additionally includes providing a frame having a frame structural member. The method further includes disposing a first bulkhead and a second bulkhead between the body structural member and the cabin floor. A gap is provided between the first bulkhead and the second bulkhead. The method further includes securing the body structural member to the frame structural member by a first fastener passing through a first location in the gap, and securing the body structural member to the rail member by a second fastener passing through a second location in the gap.

Embodiments according to the present disclosure provide a number of advantages. For example, the present disclosure provides an assembly for efficiently packaging a chassis-to-body attachment in close proximity to a seat attachment. Such assemblies result in reduced assembly size, reduced cost, and increased flexibility in vehicle design relative to existing assemblies.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
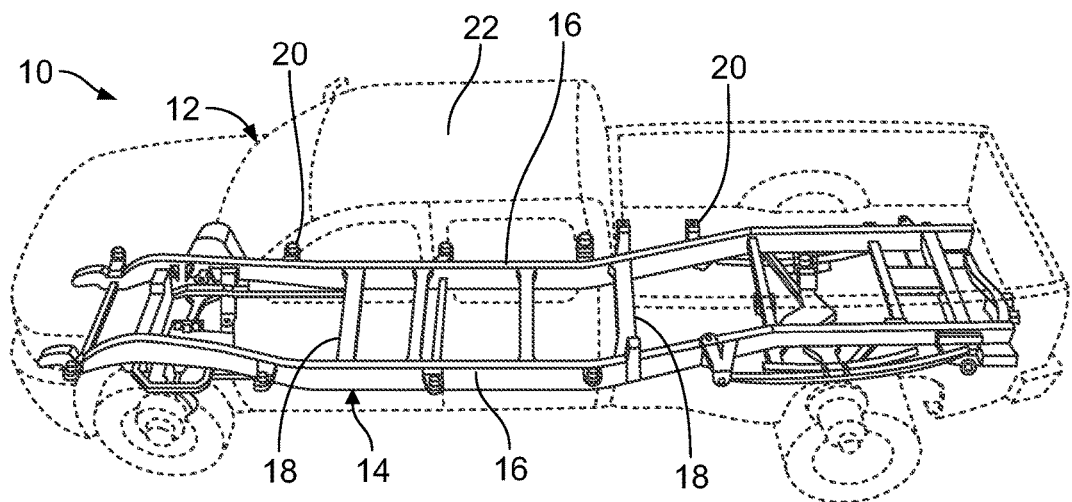
FIG. 1 illustrates a vehicle having a body-on-frame construction according to an embodiment of the present disclosure.

FIG. 1 illustrates a body-on frame assembly for a vehicle 10. As mentioned previously, body-on-frame refers to an automotive industry manufacturing methodology wherein a separate body 12 is mounted to a rigid frame 14 which supports the body 12, drivetrain, and suspension. The frame 14 includes at least one longitudinal rail 16 extending in a fore-aft direction, and at least one lateral rail 18 extending generally orthogonal to the longitudinal rails 16. The frame 14 is provided with body mounts 20, which are coupled to and supported by the longitudinal rails 16, lateral rails 18, or both. The body mounts 20 provide structural mounting points by which the body 12 may be coupled to the frame 14.

While the vehicle 10 is illustrated in FIG. 1 as a truck for exemplary purposes, embodiments according to the present disclosure may include other classes of vehicles assembled by body-on-frame construction.

Figure 2:
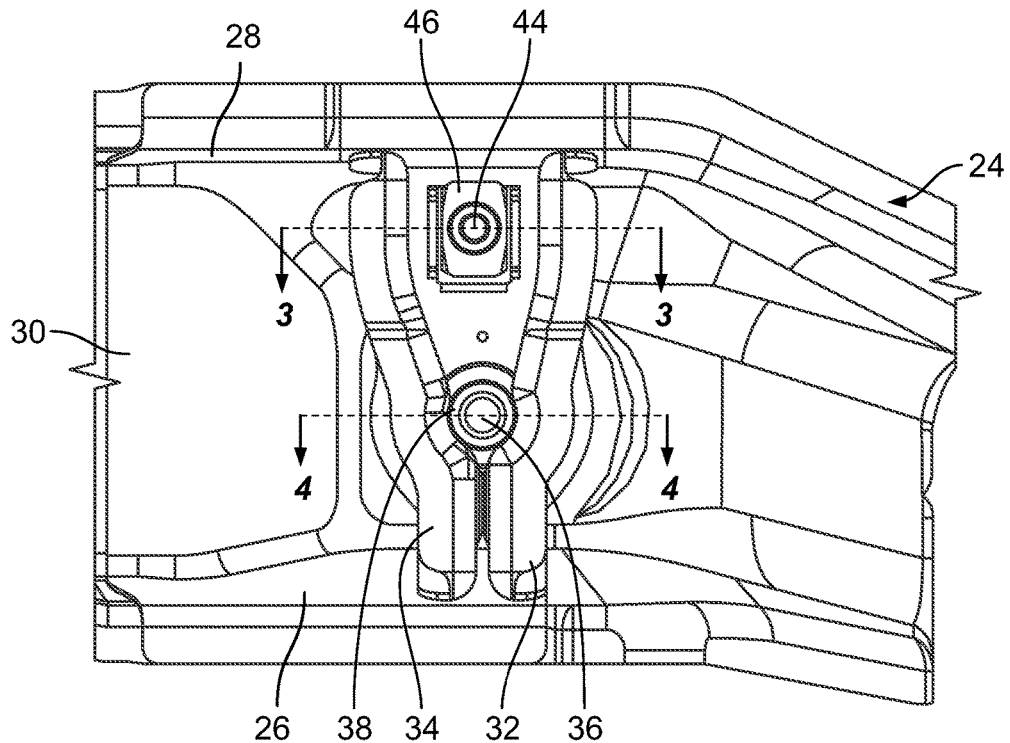
FIG. 2 is a top view of a mounting assembly according to an embodiment of the present disclosure.
Figure 3:
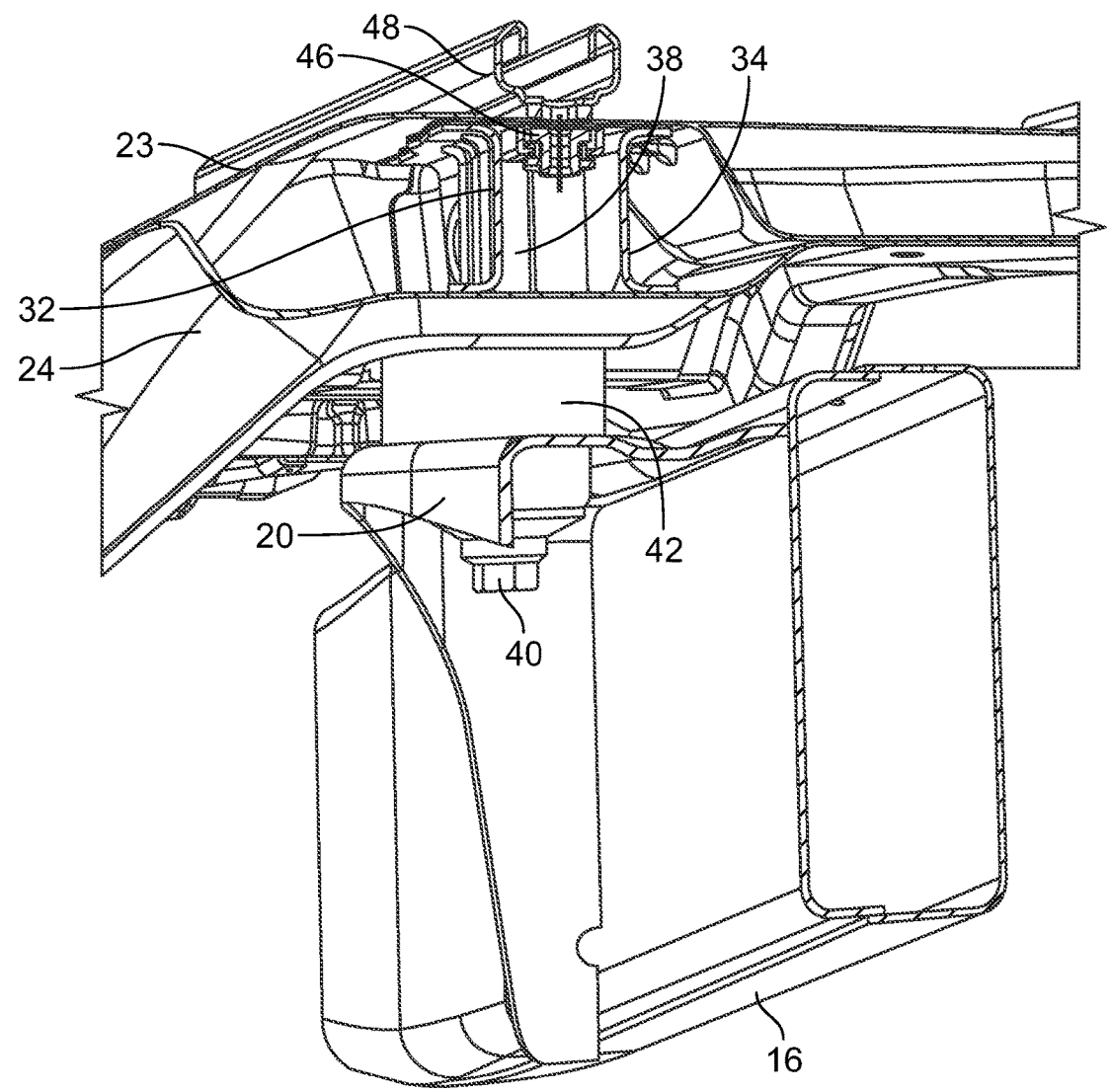
FIG. 3 is a cross-section along 3-3 of FIG. 2.
Figure 4:
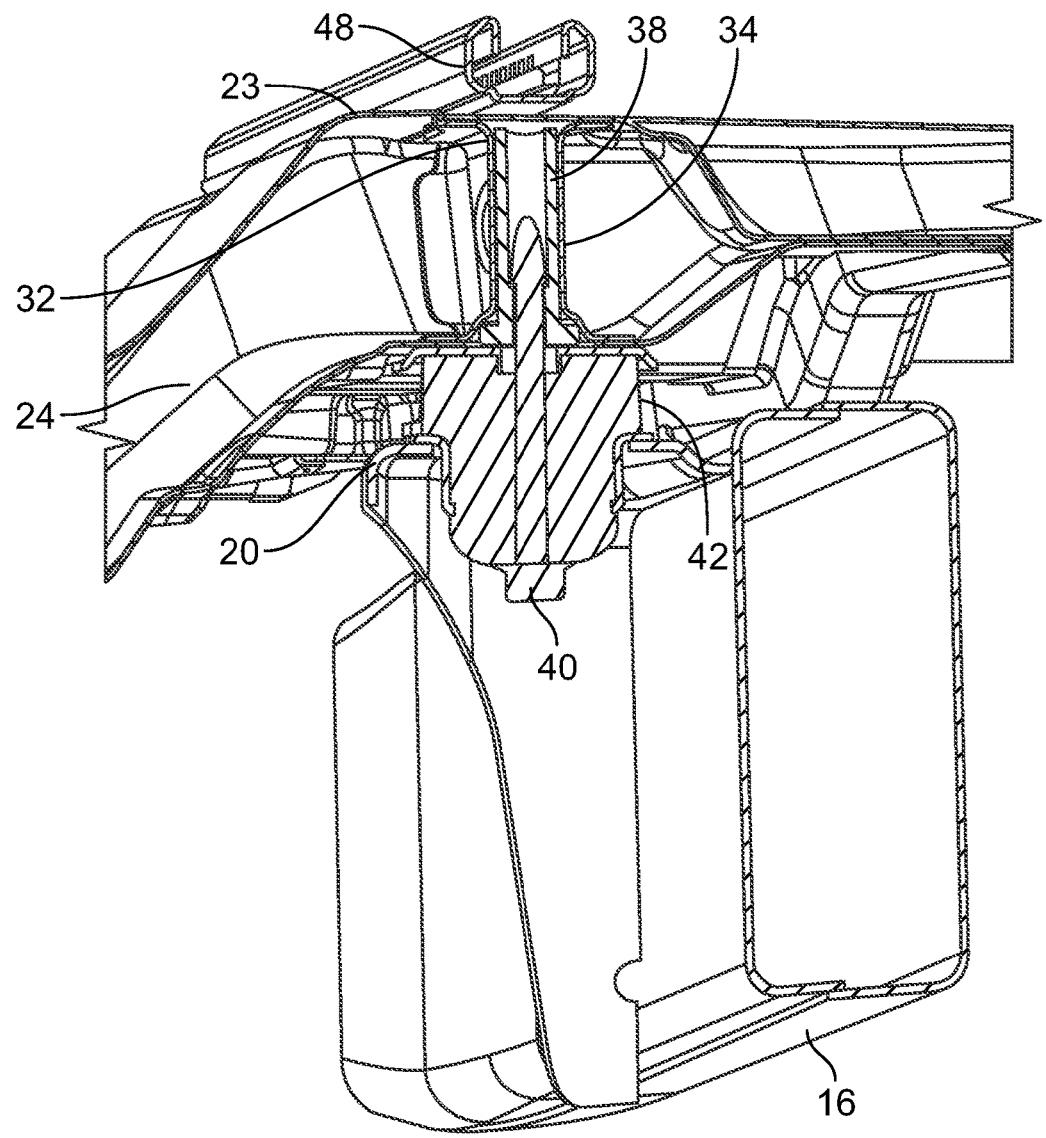
FIG. 4 is a cross-section along 4-4 of FIG. 2.
Figure 5:
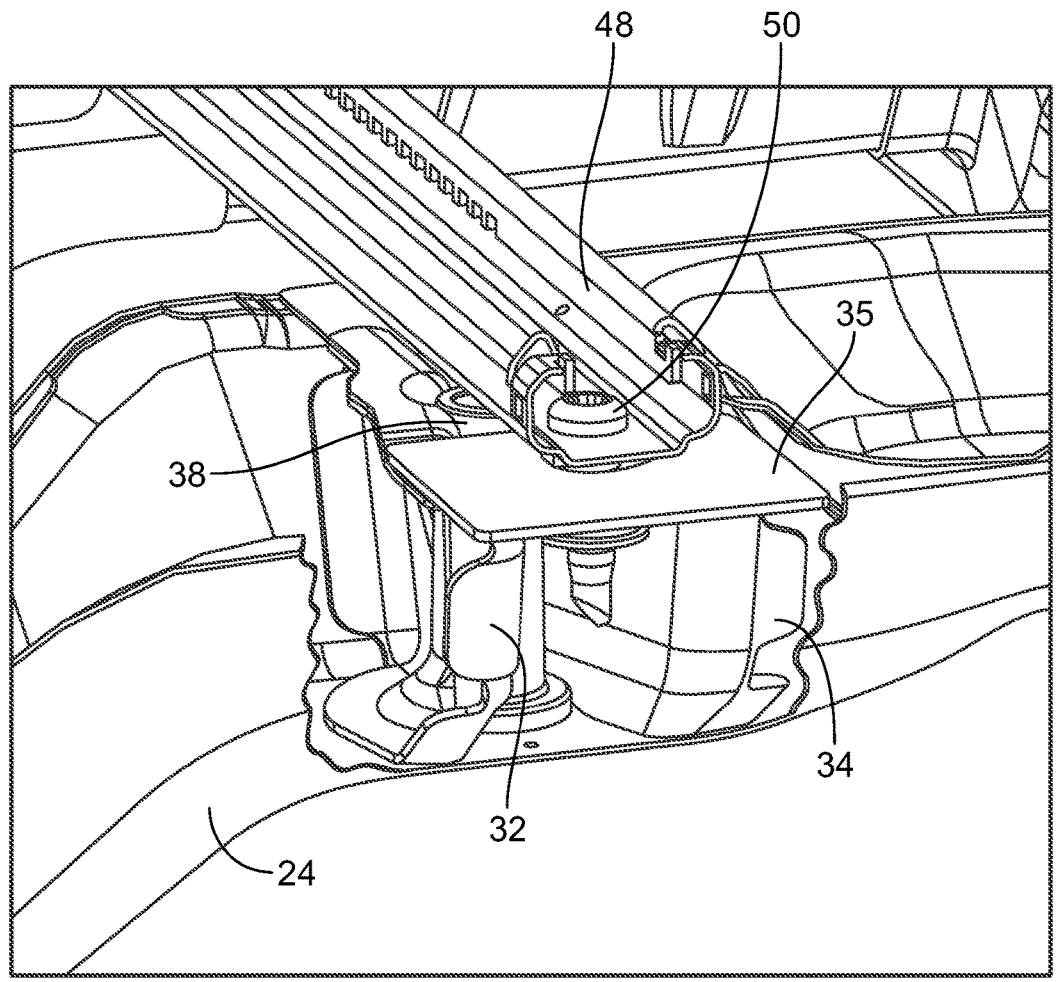
FIG. 5 is a first isometric view of a mounting assembly according to an embodiment of the present disclosure.
Figure 6:
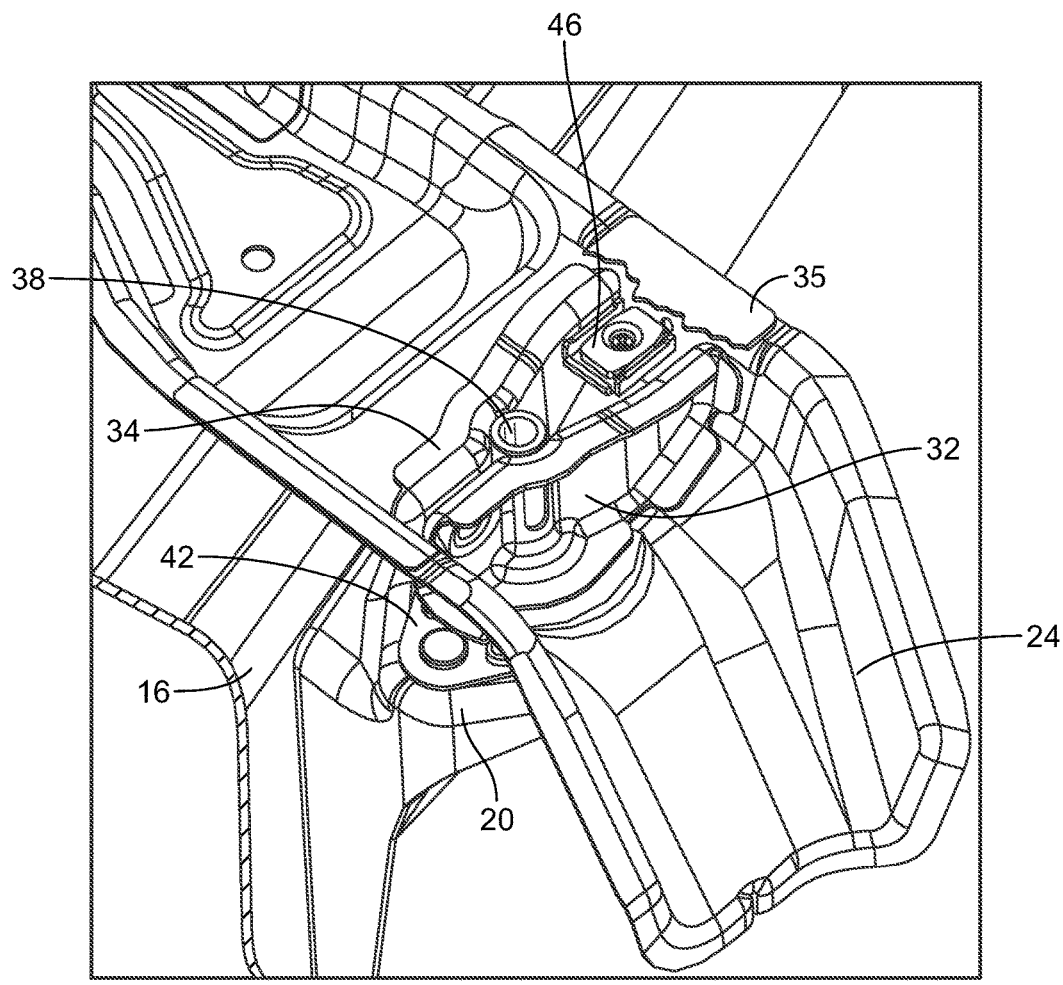
FIG. 6 is a second isometric view of a mounting assembly according to an embodiment of the present disclosure.

Referring now to FIGS. 2-5, various views of a mounting assembly according to the present disclosure are illustrated. FIG. 2 is a top view, FIG. 3 is a cross-section along 3-3 of FIG. 2, and FIG. 4 is cross-section along 4-4 of FIG. 2. FIG. 5 is a first isometric view of a mounting assembly according to an embodiment of the present disclosure, and FIG. 6 is a second isometric view. Some components may not be shown in all views in order to better highlight various portions of the mounting assembly.

The body 12 includes a cabin portion 22. A structural member 24 is provided at a lower portion of the body 12, i.e. below a floor 23 of the cabin portion 22, for coupling to the frame 14. The structural member 24 includes a channel portion having a first sidewall 26, a second sidewall 28, and an endwall 30 connecting the sidewalls 26, 28.

A first bulkhead 32 and a second bulkhead 34 are disposed within the channel portion of the structural member 24. In an exemplary embodiment, the first bulkhead 32 and the second bulkhead 34 are each generally C-shaped in cross-section, as illustrated in FIGS. 3 and 4. However, in other embodiments other shapes may be used. Proximate the first sidewall 26 of the structural member 24, the first bulkhead 32 and the second bulkhead 34 have generally straight portions disposed proximate one another which may be coupled together, e.g. via a fastener, welding, adhesive, or other appropriate joining methods. Proximate the second sidewall 28 of the structural member 24, the first bulkhead 32 and the second bulkhead 34 are splayed apart from one another. The first bulkhead 32 and the second bulkhead 34 thereby cooperatively define a cavity therebetween. A reinforcement plate 35 is provided proximate the second sidewall 28 to secure the first bulkhead 32 and second bulkhead 34 to one another. The reinforcement plate 35 may be coupled to the first bulkhead 32 and second bulkhead 34 by fasteners, welding, adhesive, or other appropriate joining methods.

A first fastener hole 36 passes through the structural member 24 at a first location between the first bulkhead 32 and the second bulkhead 34. A fastener sleeve 38 is provided between the first bulkhead 32 and the second bulkhead 34 proximate the first fastener hole 36 to receive a fastener therein.

A first fastener 40 couples a body mount 20 to the structural member 24 and is secured by the fastener sleeve 38. An isolator assembly 42 is provided between the body mount 20 and the structural member 24 to reduce vibrations transmitted between the body 12 and frame 14. The first fastener 40 thereby secures the body 12 to the frame 14.

A second fastener hole 44 passes through the cabin floor 23 and reinforcement plate 35 at a second location between the first bulkhead 32 and the second bulkhead 34. A cage nut 46 is provided between the first bulkhead 32 and the second bulkhead 34 proximate the second fastener hole 44 to receive a fastener therein.

A seat rail 48 is provided within the cabin portion 22. The seat rail 48 includes an elongate track portion within which a seat for an occupant may be retained.

A second fastener 50 couples the seat rail 48 to the reinforcement plate 35 and cabin floor 23 and is secured by the cage nut 46. The second fastener 50 thereby secures the seat rail 48 to the body 12.

While the above has been described largely in conjunction with seat rails disposed in the cabin, one of ordinary skill in the art will appreciate that other features in a cabin may likewise be mounted to the body in similar assemblies in other embodiments.

The present disclosure provides a mounting system whereby the body may be mounted to the frame and the seat rail mounted to the body by a single compact assembly, as opposed to known solutions which include separate assemblies for the body-to-frame coupling and the rail-to-body coupling. Moreover, in embodiments according to the present disclosure, the seat rail may be coupled directly to the cabin floor, thereby eliminating the need for an intermediate bracket disposed between the seat rail and cabin floor as used in conventional designs. Furthermore, the compact design of the assembly results in relatively high strength and stiffness to thereby adequately manage the load for the seat and achieve satisfactory stiffness for the frame-to-body coupling.

As may be seen, the present disclosure provides an assembly for efficiently packaging a chassis-to-body attachment in close proximity to a seat attachment. Such assemblies result in reduced assembly size, reduced cost, and increased flexibility in vehicle design relative to existing assemblies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle assembly comprising:
a frame structural member;
a body structural member;
first and second bulkheads disposed proximate the body member;
a seat rail member;
a first fastener securing the frame structural member to the body structural member between the first and second bulkheads; and
a second fastener securing the seat rail member to the body structural member between the first and second bulkheads.

2. The vehicle assembly of claim 1, wherein the first bulkhead has a first end and a second end, the first end being coupled to the second bulkhead and the second end being spaced from the second bulkhead.

3. The vehicle assembly of claim 2, further comprising a reinforcement plate coupling the second end to the second bulkhead.

4. The vehicle assembly of claim 3, wherein the second fastener secures the seat rail member to the reinforcement plate.

5. The vehicle assembly of claim 1, further comprising a fastener sleeve disposed between the first and second bulkheads, the first fastener being retained by the fastener sleeve.

6. The vehicle assembly of claim 1, further comprising a cage nut disposed between the first and second bulkheads, the second fastener being retained by the cage nut.

7. The vehicle assembly of claim 1, wherein the first bulkhead has a first bulkhead first portion, a first bulkhead second portion, and a first bulkhead third portion, the second bulkhead has a second bulkhead first portion, a second bulkhead second portion, and a second bulkhead third portion, the first bulkhead first portion is secured to the second bulkhead first portion, the first fastener is disposed between the first bulkhead second portion and the second bulkhead second portion, and the second fastener is disposed between the first bulkhead third portion and the second bulkhead third portion.

8. The vehicle assembly of claim 7, wherein the first bulkhead second portion is spaced a first distance from the second bulkhead second portion, the first bulkhead third portion is spaced a second distance from the second bulkhead third portion, and the second distance is greater than the first distance.

9. An automotive vehicle comprising:
a body having a cabin with a cabin floor;
a rail member disposed within the cabin;
a frame having a frame structural member;
a body structural member disposed below the cabin floor;
a first bulkhead disposed between the body structural member and the cabin floor;
a second bulkhead disposed between the body structural member and the cabin floor, a gap being provided between the first bulkhead and the second bulkhead;
a first fastener securing the body structural member to the frame structural member, the first fastener passing through a first location in the gap; and
a second fastener securing the body structural member to the rail member, the second fastener passing through a second location in the gap.

10. The vehicle of claim 9, wherein the first bulkhead has a first end and a second end, the first end being coupled to the second bulkhead and the second end being spaced from the second bulkhead.

11. The vehicle of claim 10, further comprising a reinforcement plate coupling the second end to the second bulkhead.

12. The vehicle of claim 11, wherein the second fastener secures the rail member to the reinforcement plate.

13. The vehicle of claim 9, further comprising a fastener sleeve disposed at the first location in the gap, the first fastener being retained by the fastener sleeve.

14. The vehicle of claim 9, further comprising a cage nut disposed at the second location in the gap, the second fastener being retained by the cage nut.

15. The vehicle of claim 9, wherein the first bulkhead has a first bulkhead first portion, a first bulkhead second portion, and a first bulkhead third portion, the second bulkhead has a second bulkhead first portion, a second bulkhead second portion, and a second bulkhead third portion, the first bulkhead first portion is secured to the second bulkhead first portion, the first fastener is disposed between the first bulkhead second portion and the second bulkhead second portion, and the second fastener is disposed between the first bulkhead third portion and the second bulkhead third portion.

16. The vehicle of claim 15, wherein the first bulkhead second portion is spaced a first distance from the second bulkhead second portion, the first bulkhead third portion is spaced a second distance from the second bulkhead third portion, and the second distance is greater than the first distance.

17. A method of assembling a vehicle comprising:
providing a vehicle body having a cabin with a cabin floor and a body structural member disposed below the cabin floor;
disposing a rail member within the cabin;
providing a frame having a frame structural member;
disposing a first bulkhead and a second bulkhead between the body structural member and the cabin floor, a gap being provided between the first bulkhead and the second bulkhead;
securing the body structural member to the frame structural member by a first fastener passing through a first location in the gap; and securing the body structural member to the rail member by a second fastener passing through a second location in the gap.

* * * * *